United States Patent [19]
Hill

[11] Patent Number: 5,083,220
[45] Date of Patent: Jan. 21, 1992

[54] SCANNING DISKS FOR USE IN TANDEM SCANNING REFLECTED LIGHT MICROSCOPES AND OTHER OPTICAL SYSTEMS

[75] Inventor: James D. Hill, Mt. Airy, Md.

[73] Assignee: Tandem Scanning Corporation, Reston, Va.

[21] Appl. No.: 497,318

[22] Filed: Mar. 22, 1990

[51] Int. Cl.$^5$ .................................................. G02B 5/30
[52] U.S. Cl. .................................................. 359/234
[58] Field of Search .................... 350/273–275, 350/235, 691, 507, 523, 527, 319, 502; 250/232, 233; 378/75, 80, 81; 353/27 R, 95, 55–57, 85; 354/94; 358/60, 87, 93, 231; 352/70

[56] References Cited

U.S. PATENT DOCUMENTS 3,517,980  6/1970  Petron et al. ..................... 35/527
4,802,748  2/1989  McCarthy et al. ................ 350/507

OTHER PUBLICATIONS

"Tandem Scanning Reflected Light Microscope", Science of Biological Specimen Preparation (pp. 85–94) SEM Inc., AMF O'Hare, Petran et al.
"The Tandem Scanning Reflected Light Microscope", SCANNING, vol. 7, pp. 97–108 (1985); Petran et al.

Primary Examiner—Bruce V. Arnold
Assistant Examiner—James Phan
Attorney, Agent, or Firm—Howard L. Rose

[57] ABSTRACT

Improvements in optical scanning disks, and methods to maximize resolution and contrast of a viewed target object featuring a Nipkow type disk and methods to produce the disk which has a multitude of pinhole apertures located in a defined annular disk region where each pinhole is equidistantly spaced from its nearest neighboring holes.

32 Claims, 2 Drawing Sheets

SCANNING DISKS FOR USE IN TANDEM SCANNING REFLECTED LIGHT MICROSCOPES AND OTHER OPTICAL SYSTEMS

TECHNICAL FIELD

This invention relates to enhanced efficiency disk configurations for optical devices and, more particularly, to modified Nipkow disks featuring a multitude of pinhole apertures uniformly spaced apart from one another on the disk and geometrically configured to achieve improved scanning.

BACKGROUND ART

In 1967 the Tandem Scanning Reflected Light Microscope was introduced by Drs. Petran and Hadravsky in Czechoslovakia. The need to view internal cellular structures with a high degree of resolution and contrast led to the development of this new theory of microscope structure which is delineated in U.S. Pat. No. 3,517,980 issued on June 30, 1970. In the disclosure of that seminal patent, the inventors describe, among other things, elimination of undesirable Airy disk imaging by the use of a rotating Nipkow disk for simultaneous scanning of the object and the image field. The Nipkow disk incorporated a multitude of minute holes extending through the disk thickness and arranged in Archimedean spirals, each corresponding to the zero maximum Airy disk for an imaged point.

One objective in ideal tandem scanning techniques is to obtain a uniform light intensity over the entire field of view. Accurately maintaining the level and uniformity of light is critical to achieve a desired measurement accuracy which often exceeds the norma theoretical resolution of conventional microscopes. Since tandem scanning microscopy devices and techniques are especially useful for viewing translucent materials exhibiting low contrast, uniform light intensity is critical, as for example in biological systems where the need for precision requires no elaboration. Likewise, in integrated circuit manufacture field-of-view light intensity uniformity is important, especially where computer programs are used to automatically identify or measure details for automatically controlling circuit production processes. Thus, high clarity images facilitate uniform manufacture of features smaller than one micrometer in size.

Moving now to a general explanation of Nipkow disks, the relative area of the pinholes to the disk surface area comprises only a small percentage. For example, a 1% disk means that 1% of the surface area is defined by holes. Consequently, such a disk can pass only 1% of impinging random light. In the case of tandem scanning microscopes, only 1% of the random light returned from out-of-focus planes within the object being observed passes through the disk to the eyepiece. Thus, where non-random light is focused through a particular pinhole, in comparison to the passage of a mere 1% of random light a significant contrast ratio to non-random light—the focused images observed with a tandem scanning microscope—is established. It should also be evident that, in general, a lower aperture area (1%) disk provides a higher contrast ratio and, therefore, is more desirable than a higher area (2%) disk. However, this is true only when the holes are evenly distributed over the entire active disk area. A 1% disk can be made by covering all of the holes in a 2% disk between an angle of 90 degrees and 180 degrees and between 270 degrees and 360 degrees. Since such a disk is made by eliminating half of the holes on a 2% disk, it is properly a 1% disk but the contrast ratio of images produced with such a disk will be no better than that with the original 2% disk. Accordingly, better contrast ratio is obtained when local concentrations or small clumps of holes are avoided and the holes are distributed over the entire active disk annulus.

One problem commonly associated with the Archimedean spiral hole pattern described above, is streaking. Streaking occurs when a tandem scanning microscope or a video camera with a frame grabber to grab a single frame for use in a computer, are employed to produce static photographic images of the target. More particularly, streaking results due to mismatching of the exposure time or the frame speed to the disk rotation speed. For example, since each scan of the target provides, by itself, substantially complete coverage of the entire field of view, the exposure time may be equivalent to the time required for the disk to rotate through eight and one-half scans, i.e. eight and one-half scanned views. A complete scan may be a single spiral or a cycle of radially staggered spirals. It is important that Archimedean spirals or cycles of spirals have beginning and end points. So, while eight scans will provide a high quality picture, the extra half-scan will result in picture streaking because the scan is stopped between the spiral or scan end points. The image produced by eight successive scans will be intense enough that one extra scan line from one hole will not greatly interfere with the picture quality. However, where several extra scan lines are grouped together, as caused by an unbalanced intensity of one target portion scan to the exclusion of the remainder, i.e. extra one half scan, a significant deterioration of picture quality results. For this reason, since the introduction of the Nipkow disk based Tandem Scanning Microscope, variations of the basic invention have been developed.

For example, McCarthy et al. in U.S. Pat. No. 4,802,748, describe a Nipkow disk for tandem scanning microscopy attempting to maximize light uniformity by relying on equidistant linear hole spacing along the Archimedean spiral; i.e. general uniform distribution on the disk. The patent disclosure stresses the importance of uniform linear spacing along the spiral and also describes the criticality to the operation of the confocal tandem scanning light microscope that 1) holes on opposite sides of the disk be exact conjugates, 2) the illumination of the image be evenly distributed, and 3) pinhole size and placement be such that overlapping scan lines are minimized. However, McCarthy, as the others in the art, does not recognize or appreciate possible benefits to having the pinholes uniformly distributed within any given segment of the disk.

SUMMARY OF THE INVENTION

Therefore, it is an object of this invention to overcome the problems with Nipkow-type disks employed in tandem scanning microscopy and other optical processes.

It is another object of this invention to provide a disk for use in optical scanning techniques that provides enhanced viewing efficiency and a method for making the disk.

Another object of this invention is to provide a method and device to improve resolution and contrast of optical viewing systems employing rotating scanning disks.

A further object of this invention is to eliminate the need to define a fixed radius in polar coordinates due to uniform hole spacing across the entire annulus of the disk's active area.

Still another object of this invention is to provide pinhole placement exhibiting point geometry where the disk has no definable cycle beginning or end.

Another object of this invention is to provide disk aperture placement which avoids overtracing of the holes during scanning and thus minimizes streaking.

These and other objects are satisfied by a scanning device for promoting high resolution and contrast of a viewed objective target, comprising a disk featuring a circular illumination area including a multitude of pinholes each located substantially equidistantly from its nearest neighboring holes in the illumination area.

Still other objects are satisfied by a method for forming a disk optimizing the resolution, contrast and illumination of a scanned object, said method employing an optical scanning device and a disk, comprising the steps of: selecting a disk of appropriate dimensions, establishing a pattern of the apertures in rectangular space, transforming the aperture points to an annulus defined by a maximum and minimum radius on the disk where each of the transformed aperture points are substantially equidistantly spaced from its nearest neighboring holes, and etching the transformed point pattern to form the apertures.

This invention describes Nipkow disk hole patterns and methods for creating such patterns by mapping points from rectangular space defined by Cartesian coordinates onto circular disk space so as to achieve equidistant hole-spacing on the disk and avoid defining beginning and end points of a cycle. By equally spacing the pinholes relative to each other on the disk and maintaining the coincidence of the corresponding holes on the opposite half of the disk, the precise hole arrangement achieves substantially uniform distribution of light and eliminates undesirable overlapping and spurious scan lines.

More particularly, this invention describes the criticality of pinhole placement in scanning disks for use in confocal tandem scanning reflected light microscopes and other optical scanning disk-based systems. The invention provides maximum illumination coverage and scan line reduction. In essence, the points in Cartesian map space are mapped onto annular disk (polar) space in a manner intended to maximize uniform placement in two dimensions on the disk surface. The invention contemplates production of the disks using traditional etching techniques, in concert with computer-controlled x-y table exposure of each individual hole for etching. Employing conventional etching techniques results in a low-cost precision disk suitable for confocal applications where the conjugate holes on opposing sides of the disk are located with high precision.

When referring to pinholes, the holes may be actual through holes or simply areas from which an opaque coating has been removed from a transparent base.

The invention should become clear to the skilled artisan upon review of the drawings and following detailed description.

DETAILED DESCRIPTION OF THE ILLUSTRATED EMBODIMENT

Figure 1:
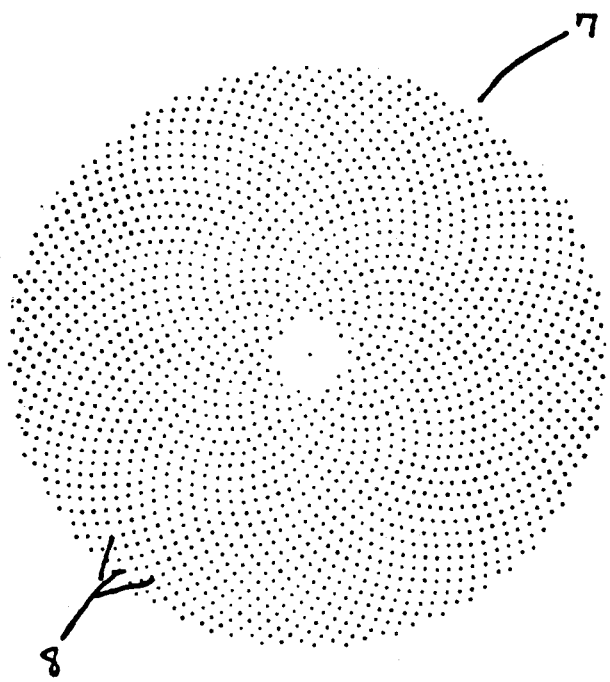
FIG. 1 is a view of a Nipkow disk hole pattern according to the invention.

FIG. 1 depicts disk 7 featuring holes 8 that have been located in accordance with this invention to be equidistant from the closest surrounding holes. The diameter of the disk and hole size are selected based on the requirements of the optical device. A conventional tandem scanning microscope will employ a disk of up to 15 cm., and have holes generally ranging in diameter from 5-40 microns with a preferred size of about 20 microns. Likewise, the intended use—brightness and degree of required elimination of randomly scattered light—governs the number of disk pinholes. The open area of the disk (accumulated pinhole volume), corresponding to light transmission, is a simplified means for characterizing the disk and most commonly ranges from 0.2% to 2.0%. The number of holes, depending on the disk size, ranges between 10,000 and 100,000 with a preferred number of about 35,000.

The disks are incorporated in an optical scanning system including a disk translating device of the type available from Daedal Series 100000 Model 105021, a programmable Newport Model 855 and Oriel of Stanford, Connecticut Models A16927 and A16947. As detailed below, $R_o$ is a constant radius which exhibits no distortion when Cartesian map coordinates are transformed to a polar coordinate system. Following the instant invention, due to the uniformity of hole spacing over the entire disk annulus, $R_o$ can be selected somewhat arbitrarily. In the context of this invention, this fact is critically important because if a disk designer were constrained to select a specific value for $R_o$, he could not then also choose values for $N_H$, $R_A$, $R_B$, $N_A$, and $N_B$, but rather, would be required to practice prior art hole placement.

Figure 2:
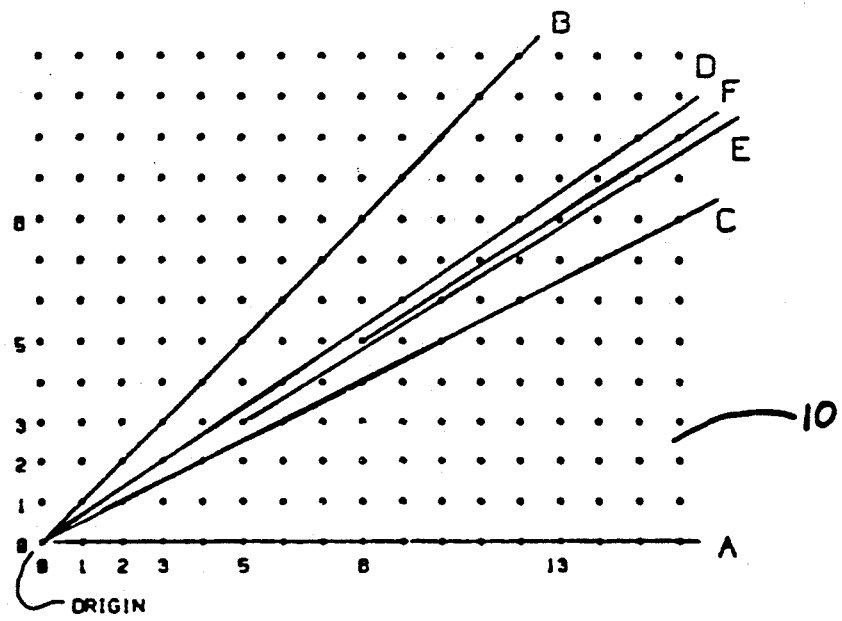
FIG. 2 represents a hole pattern and intersecting lines in Cartesian map space.

Commencing with FIG. 2 to demonstrate the principles underlying the invention, it illustrates set of holes 10, a square pattern in Cartesian map space arranged in accordance with this invention. The several lines labeled A through F represent possible choices of the X axis in Cartesian map space.

The worst choice for the X axis is line A. This choice represents no rotation. If line A is chosen as the X axis then the nearest hole to the origin will overtrack the hole at the origin. The second worst choice is line B representing overtracking of every other hole relative to the origin. Lines A and B include one eighth of all space. All Cartesian map space is composed of eight sectors, each sector is equivalent to the sector between lines A and B. Therefore, as a practical matter, the choice for subsequently selected lines should be restricted to the sector between lines A and B.

Line A passes through the hole which is up 0 and over 1 (defined as 0/1). Line B passes through the hole which is up 1 and over 1 and is defined as 1/1. Line C is the next most undesirable choice and is defined as 1/2 because it passes through the hole up 1 and over 2. It is more important to avoid the worst choice, A, than the second worst choice, B. Hence, additional choices will lie between lines B and C. The next worst choice is D, defined as 2/3.

Following this method, which defines a Fibonacci series $(X_n=X_{n-2})$ 0, 1, 1, 2, 3, 5, 8, 13, 21, 34, 55, 89, 144, 233, 377, 610, etc., the subsequent line selections are E, 3/5; F, ⅜; etc. Although not illustrated, the next choice lying between E and F is 8/13. The Fibonacci series, consequently, provides fractions following the pattern: 0/1, 1/1, 1/2, 2/3, 3/5, 5/8, 8/13, 13/21, $X_{n-1}/X_n$ and so on. The larger n becomes, the closer the values of the fractions and the closer the associated lines. Likewise, as n becomes arbitrarily large, $X_{n-2}/X_{n-1}$ substantially equals $X_{n-1}/X_n$ and therefore, $X_{n-1}/X_n=(\sqrt{5}-1)/2$. Trigonometrically, the fractions defining the various lines are the tangents of the angles of those lines.

Figure 3:
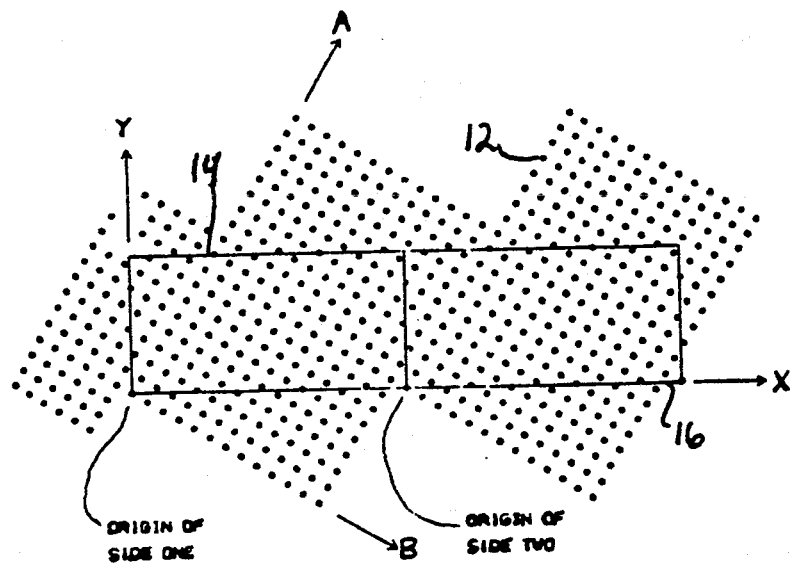
FIG. 3 depicts a pattern of holes in Cartesian map space which have been rotated relative to the axes.

Moving now to the currently-known, most advantageous hole pattern as depicted in FIG. 1, FIG. 3 depicts a square pattern of holes 12, consisting of two rectangles 14 and 16, in Cartesian map space rotated an amount determined by a selected fraction corresponding to those presented in the preceding discussion. The two rectangles, 14 and 16, are representative of the two sides of the Nipkow disk when transformed to a Cartesian system. The origin of the hole pattern of the second side must be located at a hole location referenced to the first so that side two will be exactly symmetrical with and the holes complementary to those of side one.

When hole pattern 12 is rotated according to a rational number $N_A/N_B$, $N_A/N_B$ should be as-close to the ideal value of the irrational number $(\sqrt{5}-1)/2$ as possible. Rotation of the hole pattern by the arctangent of $(\sqrt{5}-1)/2$ of the Cartesian map space provides an eminently satisfactory disk. However, this fractional rotation presents a dichotomy since one must use a rational number. Furthermore, at the origin of side 2 must be a hole in the pattern of side 1. Although the various fractions listed above have been described as worst choices, the closest fraction to the ideal value possible will be one of the so-called worst choices. However, this consideration is minimized in view of the following.

Returning now to FIG. 3, the origin for side two is located at the point A=8, B=13 relative to the origin of side one ($N_A=8$ and $N_B=13$). The holes shown in FIG. 3 are intended to be transformed (mapped) on to the disk.

The map space uses Cartesian coordinates X and Y. The coordinates of the disk are angle T and radius R. T is defined as a function of X and R as a function of Y. Since tandem scanning microscopy requires that one half of the disk be virtually exactly like the other half, the full range of X represents one half of the disk. Thus, as X varies from its minimum to its maximum value, T varies from 0 to $\pi$. Accordingly;

$$X=R_o(T) \text{ or } T=X/R_o$$

where $R_o$ is a constant and, as demonstrated below, relates to a specific value of R.

The area of a rectangle in Cartesian map space having sides $\Delta x$ and $\Delta y$ is $\Delta x \Delta y$. That rectangle mapped onto the disk has an area equal to $$((R+\Delta R)^2-R^2)\Delta T/2, \text{ or}$$

$$(2R\Delta R+\Delta R^2)\Delta T/2.$$

Establishing the area in map space to be equal to that on the disk and extrapolating from the equation above that $\Delta T=\Delta X/R_o$, then $$\Delta X \Delta Y=(2R\Delta R+\Delta R^2)\Delta X/2R_o, \text{ or}$$

$$\Delta Y=(2R\Delta R+\Delta R^2)/2R_o$$

Taking the limit as $\Delta Y$ goes to 0, $dY=(1/R_o)R(dR)$ and integrating while maintaining 0 as the constant of integration (for convenience);

$$Y = R^2/2R_o \text{ or } R = \sqrt{2R_oY}$$

Rectangles 14 and 16 have bottom and top limits of $Y_A$ and $Y_B$ respectively. Rectangle 14 extends from X=0 to X=$\pi R_o$.

The relevant choices to be made by the designer are:
$R_A$— The minimum radius of the hole pattern.
$R_B$— The maximum radius of the hole pattern.
$N_H$— The number of holes.
$N_B$— An integer taken from the sequence of numbers.
$N_A$— An integer previous to $N_B$ in the sequence.

It is preferred that $N_B$ and $N_A$ be taken from the sequence of numbers such that $R_o$ will be between $R_A$ and $R_B$ and the exact value of $R_o$ be calculated as above when an alternative approach is employed.

The area of the disk per hole is $$A_H=(R_B^2-R_A^2)\pi/N_H).$$

The distance between nearest neighbor holes in Cartesian map space is $$K_I = \sqrt{A_H}.$$

The angle F is defined as the Arctan($N_A/N_B$) and is the angle of rotation of the square hole pattern as seen in Cartesian map space. Viewing angle F conversely, is the angle of rotation of the hole pattern.

$$N_BK_I=R_o\pi\text{Cos (F) or, specifically,}$$
$$R_o=N_BK_I/\pi\text{Cos (F)}$$

$N_B$ should be chosen such that $R_o$ will be between $R_A$ and $R_B$ and $N_A$ should be the closest integer to $N_B(\sqrt{5}-1)/2$. Care should be taken so that $N_A$ and $N_B$ have no common factors.

The maximum value of Y is $Y_B=R_B^2/2R_o$.
The minimum value of Y is $Y_A=R_A^2/2R_o$.

Y and X can be calculated for each hole from the values of A and B representing the hole as shown in FIG. 3.

$$X=AK_I \text{ Sin (F)}+BK_I \text{ Cos (F)}$$

$$Y=AK_I \text{ Cos (F)}-BK_I \text{ Sin (F)}$$

The entire scanning area is covered by sequencing B from 0 to $N_B-1$, sequencing $C_S$ (the disk side number) which ranges between $-1$ and 1, and sequencing A from the lowest value which results in a value of Y greater than $Y_A$ to a value which results in a value of Y greater than $Y_B$. It should be readily appreciated that by this sequencing method, the upper left corner of rectangle 14 (representing side one) will be omitted. This corner, however, is covered by side two holes, and conversely the holes located in the upper left corner of rectangle 16 is covered by side one holes.

Figure 4:
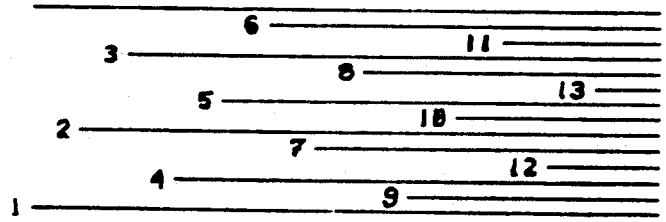
FIG. 4 is a schematic of scan lines produced by the invention.

Moving now to the salutary practical benefits of the invention, FIG. 4 presents a somewhat idealized schematic of scan lines produced by different arrays of holes subject to selected values of $N_A$ and $N_B$ chosen (compression of the horizontal dimension with an undistorted vertical dimension or for a corresponding circular map, radial compression). The line labeled "1" corresponds to the track of the hole defining the origin in FIG. 3. The top line of FIG. 4 is the track of the hole located at A=1, B=0 in FIG. 3. The remaining lines represent the tracks of intervening holes.

In essence, the numbered lines are the tracks established by the thin band of holes extending across the bottom of rectangle 14. The numbering sequence of the lines follows the order in which they cross the Y axis as hole pattern 12 moves from right to left. While it should be evident, the reader is invited to observe that each hole crosses the Y axis in the largest available vertical space, thus avoiding any undesirable line grouping or bunching.

Figure 5:
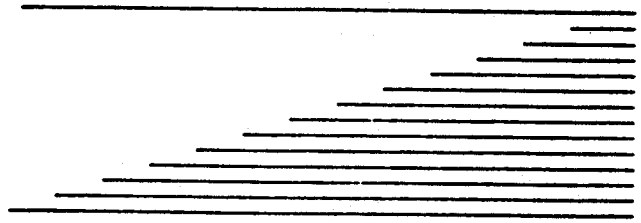
FIG. 5 is a schematic of scan lines produced by prior art disks.

FIG. 5 clearly illustrates line bunching in a line pattern corresponding to scanning tracks obtained from prior art disks subject to processing to interlace the cycles. The tracks for one cycle of a disk bunch undesirably along one viewing target sector if a part of a cycle is included in an exposure. This varies significantly from FIG. 4 where the sequential scans are substantially evenly distributed over the entire cycle.

Since this invention is intended to be associated with optical instrumentation and, especially, tandem scanning microscopes, due to the basic description of apparatus and methods for tandem scanning microscopy contained in the above-identified Petran et al. patent, U.S. Pat. No. 3,517,980, its content is incorporated herein by reference.

FIG. 4 shows that the space between line 1 and the top line has been divided into $N_b$ equal spaces, in this case 13. The various lines are located within this space according to the following formula:

$$Y = J - (IN_a/N_b)$$

where I is an integer ranging from 0 to $N_b - 1$ and J is an integer such that Y has a value between 0 and 1.

The exact values are Y = −0, 5/13, 10/13, 2/13, 7/13, 12/13, 4/13, 9/13, 1/13, 6/13, 11/13, 3/13, and 8/13.

An equally useful pattern can be calculated from the formula:

$$Y = (IN_a/N_b) - J$$

This pattern can be derived by either inverting FIG. 4 or by rotating the hole pattern in Cartesian map space by the angle $-\arctan(N_a/N_b)$ When disk hole patterns are derived by locating holes along spirals, a streak free disk can be made by locating the first hole of subsequent spirals within a cycle at a radius proportioned between the first two holes of the first spiral of the cycle according to the above formula for Y, Y=0 being omitted as it applies to the first spiral.

Based on the foregoing, these and other variations and modifications should now be evident to the skilled artisan and, as such, are intended to fall within the scope of the invention as defined by the following claims.

What is claimed is:

1. A scanning device for promoting high resolution and contrast of a viewed objective target, comprising a disk featuring a circular illumination area defined between radially inner and outermost pinholes including a multitude of pinholes, each pinhole located substantially equidistantly from its nearest neighboring holes in the illumination area.

2. A scanning device according to claim 1 where the holes are located in the illumination area by mapping evenly spaced points from rectangular space into the circular illumination area of the disk, after having rotated the hole pattern of the Cartesian map space by the arctan $(\sqrt{5} - 1)/2$.

3. A scanning device according to claim 2 where the illumination area is divided into two identical segments, one defining a half of the illumination area and, whereupon rotation of the disk around its center, no two pinholes in the same half overtrack the same area and each pinhole in the other half positionally corresponds exactly to one pinhole in the first half.

4. A scanning device according to claim 1 wherein the illumination area contains approximately 35,000 pinholes which are sized to constitute approximately one-quarter percent (¼%) of the surface of the illumination area.

5. A scanning device according to claim 1 where the Cartesian coordinates of the equidistantly spaced pinholes arranged in spirals in polar coordinates are located according to the following:

$$X = AK_I \sin(F) + BK_I \cos(F)$$

$$Y = AK_I \cos(F) - BK_I \sin(F)$$

where angle F is $\text{Arctan}(N_A/N_B)$, A and B are selected rectangular pattern coordinates, $N_B$ pattern and defines the number of spirals in a cycle, $N_A$ is an integer previous to $N_8$ in a sequence of numbers, $K = \sqrt{A_H}$ is the distance between nearest neighbor holes in map space and $A_H$ is the aperture area.

6. A scanning device according to claim 5 wherein $$N_A/N_B \approx \frac{(\sqrt{5} - 1)}{2}.$$

7. A scanning device according to claim 6 wherein said disk has C cycles where $N_A + N_B$ are successive numbers in the sequence and are multiplied by C.

8. A scanning device according to claim 1 wherein said pinholes are located in the space between the radially inner and outermost pinholes of a pinhole pattern of said disk according to the formula $$Y = J - (IN_A/N_B)$$

where I is an integer ranging from 0 to $N_b - 1$ and J is an integer such that Y has a value between 0 and 1.

9. A scanning device according to claim 8 wherein
   said pinholes are located along a plurality of spiral paths in cycles,
   the first pinholes of spirals after the first spiral of each cycle being located radially between the first two pinholes of said first spiral.

10. A scanning device according to claim 1 wherein said pinholes are located in the space between the radially inner and outermost pinholes of a pinhole pattern of said disk according to the formula $$Y = (IN_A/N_B) - J$$

where I is an integer ranging from 0 to $N_b-1$ and J is an integer such that Y has a value between 0 and 1.

11. A scanning device according to claim 10 wherein said pinholes are located along a plurality of spiral paths in cycles,
the first pinholes of spirals after the first spiral of each cycle being located radially between the first two pinholes of said first spiral.

12. An improved Nipkow-type scanning disk for use in optical devices, comprising a disk of a selected radius R, said disk defining an annulus having a minimum radius $R_A$ and a maximum radius $R_B$ where the disk is dividable into two halves with identical hole patterns, said disk further defining a plurality of small apertures where the apertures in each half of said disk are so patterned within the annulus that a complete scanning cycle can be initiated at any disk radius without any holes overtracing the same point.

13. A scanning disk according to claim 12 wherein the apertures are located along a plurality of spiral paths in cycles,
the first apertures of spirals after the first spiral of each cycle being located radially between the first two apertures of said first spiral.

14. A scanning disk according to claim 13 where the annulus contains approximately 35,000 apertures and are sized to constitute approximately one-quarter percent (¼%) of the annulus surface area.

15. A scanning disk according to claim 12 where the pattern of apertures is formed by mapping spaced points from rectangular space into the annulus, after having rotated the x-axis of the rectangular spaced by the arctan$(\sqrt{5}-1)/2$ so as to repeat the pattern over a number of scanning cycles to provide inherent interlacing of aperture patterns.

16. A scanning disk according to claim 12 where each aperture is equidistant from its nearest neighboring apertures.

17. A method for forming a disk optimizing the resolution, contrast and illumination of a scanned object, said method employing an optical scanning device and a disk, comprising the steps of:
selecting a disk of appropriate dimensions,
establishing a pattern of aperture points in rectangular space,
transforming the aperture points to an annulus defined by a maximum and a minimum radius on the disk where each of the transformed aperture points is substantially equidistantly spaced from its nearest neighboring aperture points, and
rendering transparent the aperture points of the transformed point pattern.

18. A method according to claim 17 where the aperture points are converted from rectangular space into the annulus by rotating the hole pattern of the rectangular space an optimum angle, where no two scan lines traced by the apertures overlap.

19. A method according to claim 17 further comprising the steps of inserting the disk between an illumination source and the object prior to rotating the disc, and rotating the disk.

20. A method according to claim 17 further comprising the step of defining the number of apertures to be approximately 35,000 where each disk half contains approximately 17,500 apertures, and sizing the apertures to constitute substantially one-quarter percent (¼%) of the total disk surface area.

21. A method according to claim 17 further including the step of calculating the Cartesian coordinates of each of the spaced apertures to be substantially equidistantly spaced in polar coordinates according to the following:

$$X = AK_I \sin(F) + BK_I \cos(F)$$

$$Y = AK_I \cos(F) - BK_I \sin(F)$$

where angle F is Arctan$(N_A/N_B)$, A and B are selected rectangular pattern coordinates, $N_B$ is an integer taken from a sequence of numbers and $N_B$ defines the number of spirals in a cycle, $N_A$ is an integer previous to $N_B$ in the sequence, $K_I = \sqrt{A_H}$ is the distance between nearest neighbor holes in map space and $A_H$ is the magnitude of the area of the disk associated with or assigned to each aperture.

22. A method according to claim 21 wherein $$T = X/R_o$$

where T is an angle, X is a Cartesian map space coordinate and $R_o$ is a constant and relates to a specific value of R $$R = \sqrt{2R_o Y}$$

where R is a radius and Y is a Cartesian map space coordinate.

23. A method for maximizing contrast and resolution of a viewed object in confocal tandem scanning microscopy comprising the steps of:
providing a rotatable disk featuring an annular illumination area including a multitude of pinholes each located equidistantly from its nearest neighboring holes in the illumination area,
inserting the disk between a microscope illumination source and the object, and
rotating the disk to scan the object.

24. An optical scanning disc comprising
an opaque material having an annulus of transparent points lying between minimum and maximum radii,
said points lying along multiple paths established in a rectangular array of equally spaced points each of which paths intersects a minimal number of points of the array.
one of said paths being located between said minimum and maximum radii and deviates substantially from any path parallel to any path heavily populated with said points, the remaining paths being defined by a Fibinocci series,
said points on the disc lying along said paths as transformed into circumferential paths in the annulus.

25. An optical scanning disc according to claim 24 wherein said points are located along paths which are non-repetitive over a substantial sector of each half of said disc.

26. An optical scanning disc according to claim 24 wherein
said points are located on said disc by mapping evenly spaced points from rectangular space into the circular illumination area of the disc by a transformation according to $$R = f(Y) \text{ and } T = KX$$

where R is the radial position on the disc and T is the angular position on the disc, X and Y are the coordinatants in rectangular space, f(Y) is a monatomic function of Y, K≠ is a constant and g(Z) is a slowly varying function of Y or R.

27. An optical scanning disc according to claim 26 wherein $f(Y) = \sqrt{2R_o}Y$, $K = 1/R_o$ and $R_o$ is a constant.

28. A scanning disc as in claim 27 where the pattern of points in rectangular space is a square pattern rotated by an angle F where $F \approx \arctan(\sqrt{5}-1)/2$.

29. An optical scanning disc according to claim 26 wherein the pattern of points in rectangular space is a Bravais net.

30. A scanning disc comprising
an opaque material,
apertures in said opaque material with the apertures being arrayed in spirals,
wherein the first apertures of subsequent spirals after the first spiral of a cycle are proportional along said subsequent spirals over the range required to complete a scan according to the formula $$Y = J - (IN_A/N_B)$$

where Y is a fraction of the range required, I is an integer ranging from 1 to $N_B-1$, $N_B$ is the number of spirals in a cycle, J is an integer such that Y has a value between 0 and 1 and $N_A$ is an integer such that the first apertures of a cycle of spirals or rays are staggered in a pseudo-random fashion thereby eliminating streaking.

31. A scanning disc as in claim 30 where $N_A/N_B \approx \pm(\sqrt{5}-1)/2$.

32. A method for designing the aperture pattern of a scanning disc, said method comprising the steps of:
selecting the minimum and maximum radii of the area of the disc to be covered with holes,
establishing a pattern of points in rectangular space,
transforming the pattern of points to an annulus defined by a minimum and a maximum radius on the disc, and
locating apertures in said disc according to the transformed pattern of points.

* * * * *